United States Patent [19]
Disselbeck

[11] Patent Number: 5,714,226
[45] Date of Patent: Feb. 3, 1998

[54] POROUS HONEYCOMB MATERIAL AND MANUFACTURE AND USE THEREOF

[75] Inventor: Dieter Disselbeck, Bad Soden am Taunus, Germany

[73] Assignee: Hoechst Aktiengesellschaft, Germany

[21] Appl. No.: 592,604

[22] Filed: Jan. 26, 1996

Related U.S. Application Data

[63] Continuation of Ser. No. 876,565, Apr. 30, 1992, abandoned.

[30] Foreign Application Priority Data

May 4, 1991 [DE] Germany ............... 41 14 570.4

[51] Int. Cl.⁶ .................................................. B32B 3/12
[52] U.S. Cl. ................... 428/116; 428/107; 428/118; 428/175; 428/178; 428/312.6; 428/312.8
[58] Field of Search ............... 428/116, 118, 428/178, 182, 175, 312.6, 312.8, 107

[56] References Cited

U.S. PATENT DOCUMENTS

| H47 | 4/1986 | Monib | 428/116 |
|---|---|---|---|
| 3,673,058 | 6/1972 | Jackson | 428/107 |
| 3,887,739 | 6/1975 | Kromrey | 428/116 |
| 4,808,460 | 2/1989 | Chyung | 428/178 |
| 5,128,192 | 7/1992 | Narasaki | 428/118 |

FOREIGN PATENT DOCUMENTS

| 368238 | 5/1990 | European Pat. Off. |
| 2051685 | 7/1970 | France . |
| 3027307 | 2/1981 | Germany . |
| 6704016 | 9/1967 | Netherlands . |
| 8910258 | 11/1989 | WIPO . |

*Primary Examiner*—Timothy Speer
*Attorney, Agent, or Firm*—Connolly & Hutz

[57] ABSTRACT

A honeycomb material is disclosed whose walls are formed from a network of a porous fiber composite, said composite being a reinforcing yarn embedded in a resin matrix.

17 Claims, 3 Drawing Sheets

POROUS HONEYCOMB MATERIAL AND MANUFACTURE AND USE THEREOF

This application is a continuation of application Ser. No. 07/876,565, filed on Apr. 30, 1992 now abandoned.

The present invention concerns a honeycomb material whose walls are made of a porous network comprising a fiber composite, processes for manufacturing this material and the use of the material.

Honeycomb material, a lightweight building material with a honeycomb structure, has found wide application in particular as core material for sandwich structures. The conventional material consists of aluminum or of composites with thermosetting resin systems, in particular of NOMEX™, paper which has been impregnated with phenolic resins and cured.

PCT Patent Application WO 89/10258 discloses a process for manufacturing honeycomb material wherein a staple fiber web and a thermoplastic are used to produce an uninterrupted, fiber-reinforced sheet material which is then made into the honeycomb material in a conventional manner. The production of the uninterrupted fiber-reinforced sheet material can be effected here, to avoid impregnating steps, by laying down a mixture of thermoplastic fibers and reinforcing fibers to form a web which is then melted together to form the sheet of material by hot calendering. A further alternative described therein is the conjoint hot calendering of a fiber web with a thermoplastic film.

A similar process is known from German Patent 3,838,153. There a fiber web consisting chiefly of inorganic materials and a heated thermoplastic film strip are bonded together by means of a rolling process.

However, these known embodiments of honeycomb materials are unable to meet the many practical demands and expectations. For instance, there are problems with the processing of honeycombs into sandwich structures and the use thereof due to the gases trapped in these honeycomb sandwich structures. Especially honeycomb materials with uninterrupted outside surfaces can give rise to serious problems when the components are introduced into zones of reduced air pressure, since the then insufficiently counterbalanced internal pressure can cause destabilization of the components. Similarly, the relatively high moisture regain of existing honeycombs made of Nomex paper (hot-wet characteristics) frequently causes difficulties and the damage tolerance under impact stress is frequently inadequate. Finally, the recyclability of modern construction materials is becoming an ever more important aspect and in this respect too conventional honeycomb materials fail to come up to requirements.

The honeycomb material of the present invention has little if any of the above defects. Its walls are made of a porous network comprising a fiber composite.

The porous network of the honeycomb material according to the present invention, like a fishing net, consists of a multiplicity of crossingly interconnected elements within the fiber composite, which leave open voids in between.

The fiber composite comprises a reinforcing yarn embedded in a resin matrix.

Resins suitable for the purposes of the present invention are all macromolecular crosslinked or uncrosslinked substances whose mechanical strength is sufficient for conferring dimensional stability on the fiber composite. Crosslinked polymers suitable for use as matrix resin are crosslinked two-component resins such as epoxy resins, unsaturated polyesters (alkyds) or in particular thermosetting resins such as phenolic resins, melamine resins or urea resins.

Other, industrially less common resin systems may also be used.

Preferably, the fiber composite of the honeycomb material comprises a reinforcing yarn embedded in a thermoplastic matrix and comprising filaments with a higher melting point than the thermoplastic of the matrix.

The thermoplastic matrix in these preferred embodiments comprises a generally uncrosslinked organic addition or condensation polymer that is meltable without decomposing.

Depending on the intended purpose, a thermoplastic having a suitable melting or softening point is selected from the multitude of available thermoplastics. The organic polymer of the thermoplastic matrix advantageously has a melting point of from 100° to 400° C. Suitable basic materials for a thermoplastic matrix are polymers such as substituted or unsubstituted polyalkylene, for example polyethylene, polypropylene or polyvinyl chloride. Particularly suitable matrix resins, on account of the varied modifiability of their composition and properties, are polycondensation polymers, in particular partly or wholly aromatic polyesters, aliphatic or aromatic polyamides, polyether ketones, polyether ether ketones, polyether sulfones, polysulfones, polyphenylene sulfide or polyether imide.

The preparation, processing and properties of these thermoplastic matrix resins is known to the person skilled in the art. They are described in the relevant literature and are commercially available in many grades covering a wide range of specifications. An overview with further numerous references is given in Ullmann's Encyclopedia of Industrial Chemistry, 5th edition, volume A7, page 369 ff. (Composite Materials) and also volume A13, page 1 ff. (High-Performance Fibres).

The reinforcing yarn contained in the fiber composite of the honeycomb material according to the present invention can be a staple fiber yarn or a textured or untextured continuous filament fiber yarn.

Staple fiber yarns are produced by secondary spinning from relatively short filament sections as present in natural fibers or in synthetic staple fibers.

Continuous filament fiber yarns consist of continuous man-made synthetic-polymer (for example polyester) or natural-polymers (for example regenerated cellulose) filaments.

The yarns can have been textured; that is, they may have a more or less pronounced crimp and they may be twisted or twistless.

The choice of basic substance for the fiber material does of course depend on the nature of the matrix resin.

The choice of basic fiber material is substantially free in the case of crosslinking matrix resin. In this case the filaments of the reinforcing yarn can also be made of an inorganic material, for example glass fibers, mineral fibers, ceramic fibers or carbon fibers, or of an organic, spinnable material. Reinforcing yarns made of organic fibers can consist of natural fibers, for example cellulose fibers such as cotton, jute, flax or hemp fibers, or protein fibers, for example wool or silk. However, the preferred organic fibers are man-made synthetic-polymer or natural-polymer fibers, since the properties thereof are very readily adaptable to the intended use in a conventional manner.

Preferred fiber materials for the reinforcing yarns contained in the honeycomb materials according to the present invention are therefore in addition to the inorganic fibers of glass or carbon synthetic fibers made of polyolefins, in particular polyethylene and polypropylene, partly or wholly aromatic polyesters, aliphatic or aromatic polyamides, polyether ketones, polyether ether ketones, polyether sulfones, polysulfones, polyacrylonitrile, polyphenylene sulfide or polyether imides. For cost-benefit reasons the reinforcing yarns which are particularly preferred at present are made of polyacrylonitrile or of polyesters, in particular based on terephthalic acid and ethylene glycol. These polyesters may contain in addition to the basic building blocks mentioned further dicarboxylic acid and/or diol building blocks which modify their properties, for example radicals of isophthalic acid, aliphatic dicarboxylic acids having on average 6–10 carbon atoms, of sulfoisophthalic acid, radicals of long-chain diols having on average from 3 to 8 carbon atoms, ether diols, for example diglycol or triglycol radicals, or else small amounts of polyglycol radicals. These modifying components are in general present as cocondensed units in the polyester in not more than 15 mol %. Particular preference is given to reinforcing yarns made of polyethylene terephthalate containing less than 5 mol % of modifying components, in particular made of pure unmodified polyethylene terephthalate or polybutylene terephthalate.

Of particular suitability here are of course the high-strength industrial polyacrylonitrile and polyethylene terephthalate fibers such as the DOLANIT™ or TREVIRA HOCHFEST™ products available from Hoechst AG.

If the matrix resin is a thermoplastic resin, care must be taken that the filaments of the reinforcing yarn are made of inorganic material as mentioned above (for example glass fibers, mineral fibers, ceramic fibers, carbon fibers) or of an organic, spinnable material whose melting point or decomposition point is higher than the melting point of the matrix material combined therewith.

Depending on the available equipment for manufacturing the honeycomb material according to the present invention, in particular on the accuracy of the temperature control means, the yarn material and the matrix material are chosen in such a way that the melting point or decomposition point of the material of the filaments of the reinforcing yarn is at least 10° C., preferably at least 30° C., above the melting point of the matrix material.

The weight ratio of the reinforcing yarn to matrix material lies within the range from 20:80 to 80:20, preferably within the range from 40:60 to 60:40. In any particular case it is determined in such a way that, on forming the textile material, the spaces between the threads are opened up satisfactorily to give the desired porous network.

Some examples of suitable combinations for the fiber composite contained in the honeycomb material according to the present invention are (in the order fiber/matrix): polyethylene terephthalate/polybutylene terephthalate, glass/polyethylene or polypropylene, glass/polyether imide, carbon fiber/polyether ketone, aromatic polyamide(aramid)/polyethylene terephthalate, polyacrylonitrile/polyethylene terephthalate.

BRIEF DESCRIPTION OF THE DRAWINGS

The invention will now be more particularly described with reference to FIGS. 1 to 6.

The wavy sheet material depicted in this figure has planar wave crests (4).

Figure 1:
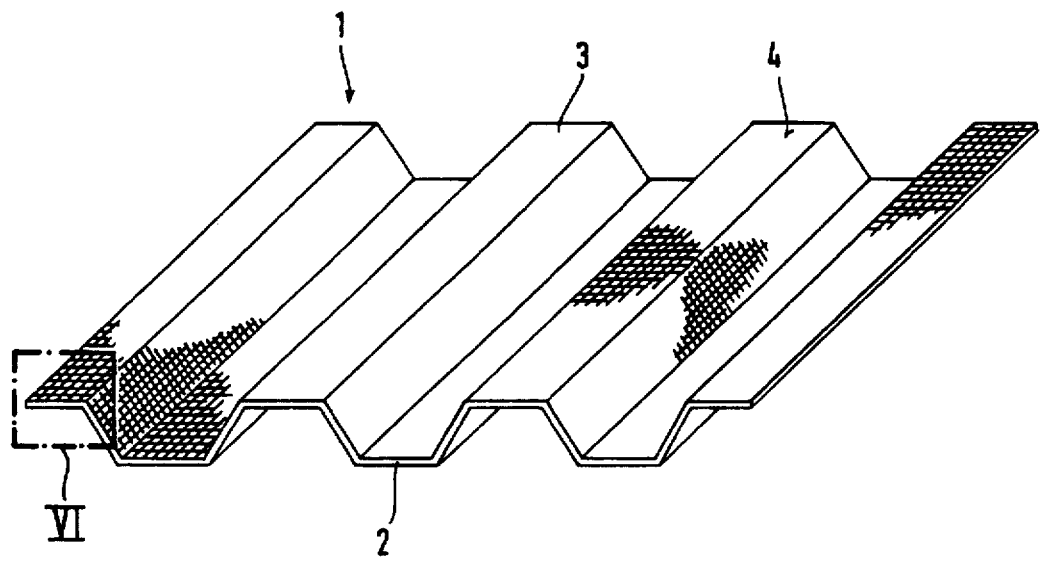
FIG. 1 is an oblique plan view of a section of a wavy sheet material (1) produced according to the present invention by a drawing process, where the textile base material (2) rises into spaced-apart, straight-line, stripey elevations (3) having nettily porous walls. The filigree network of the wavy sheet material is indicated in the diagram by the checkered hatching, applied for clarity only in some areas.
Figure 2:
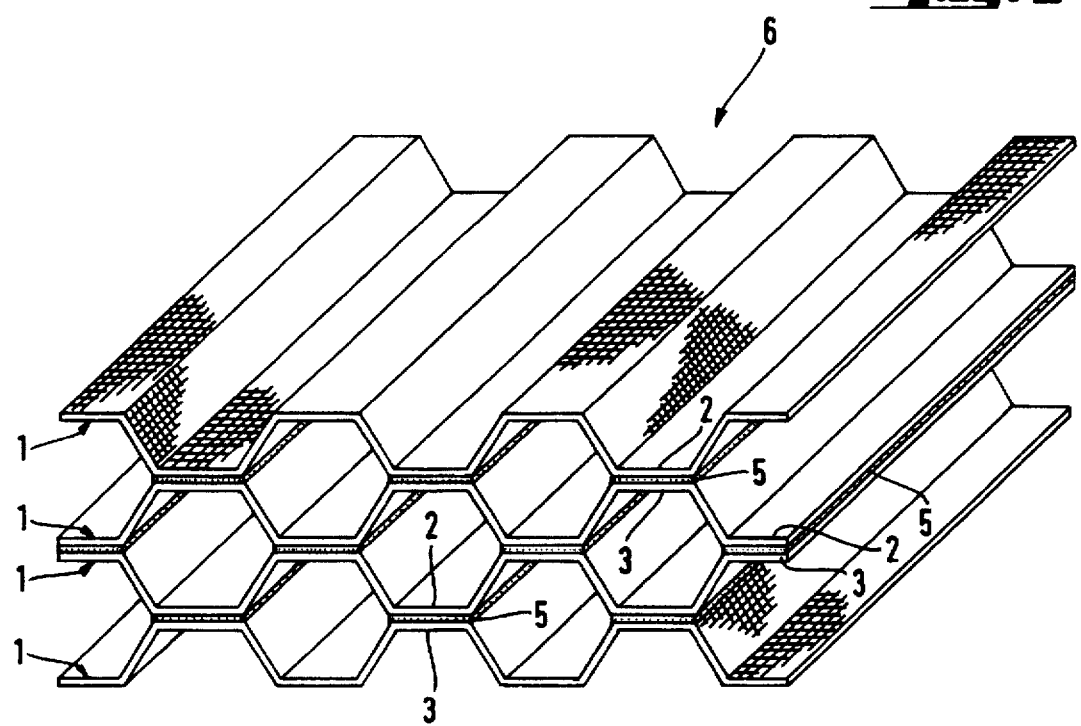

FIG. 2 is an oblique plan view of a section of a honeycomb block (6) obtained by stacking 4 of the wavy sheet materials depicted in FIG. 1 on top of one another and adhering them together at the stripey contact surfaces (5).

Figure 3A:
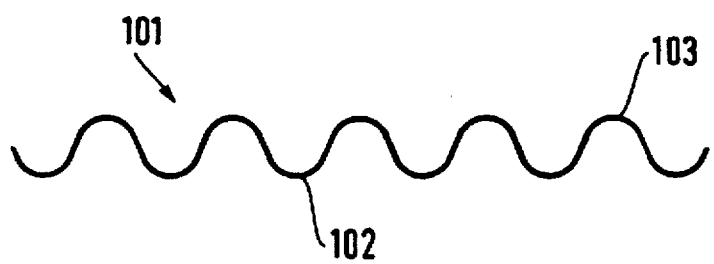
Figure 3B:
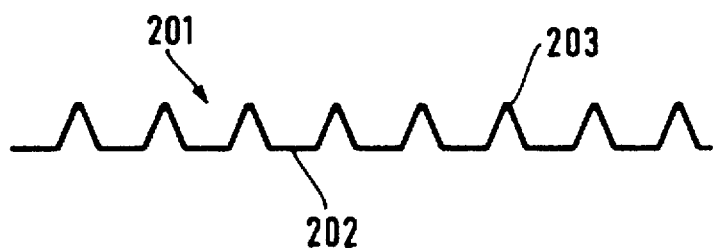

FIGS. 3a and 3b are diagrammatic sections of further examples of wavy sheet materials (101, 201) produced according to the invention by a drawing process, which each rise from the textile base material (102, 202) into spaced-apart, straight-line, stripey elevations (103, 203) with nettily porous walls and have pointed (FIG. 3a) or curved (FIG. 3b) wave crests.

Figure 4A:
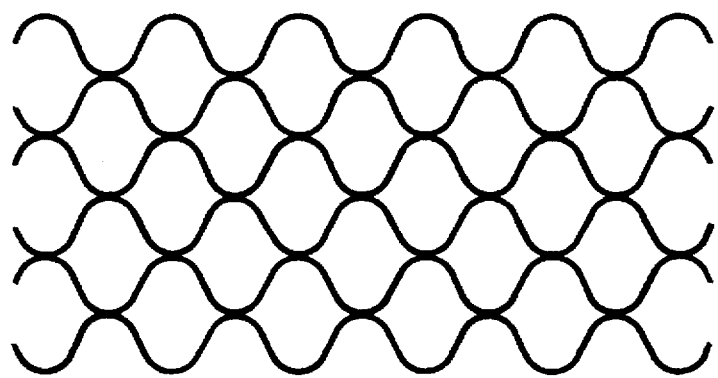
Figure 4B:
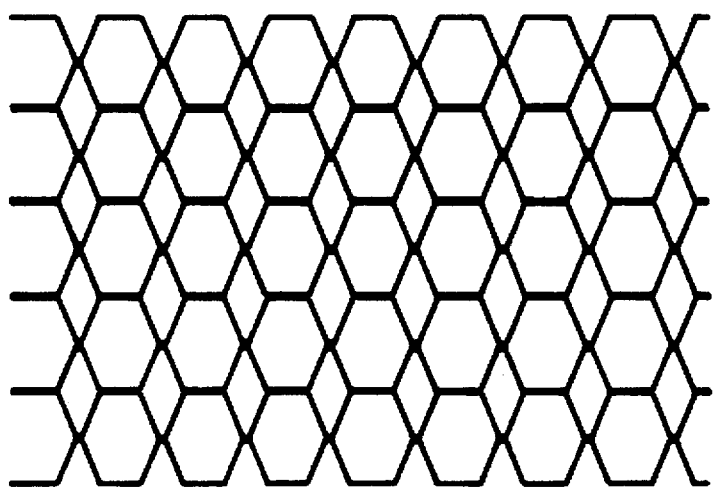

FIGS. 4a and 4b are diagrammatic sections through honeycomb blocks (106) and (206) obtained by stacking the wavy sheet materials depicted in FIGS. 3a and 3b and bonding them together in a tear-resistant manner at the contact zones.

Figure 5:
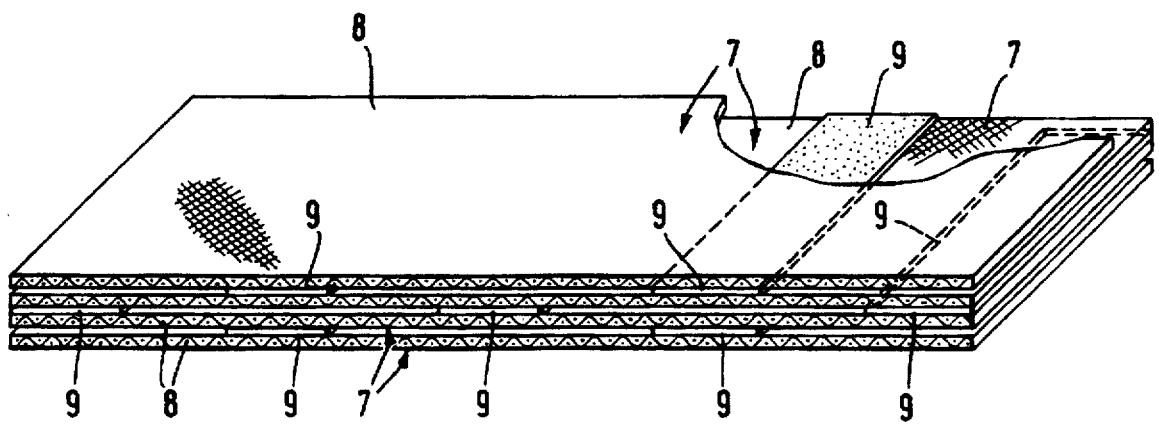

FIG. 5 is an oblique plan view of a section of a stack of a plurality of plies (7) of a formable textile sheet material (8) produced from a reinforcing yarn and containing the matrix material, any two adjacent layers having been bonded together in a tear-resistant manner in spaced-apart straight, stripey zones (9) by means of a bonding agent (10) and the stripey bonding zones (9) of successive layers having been mutually offset.

Figure 6:
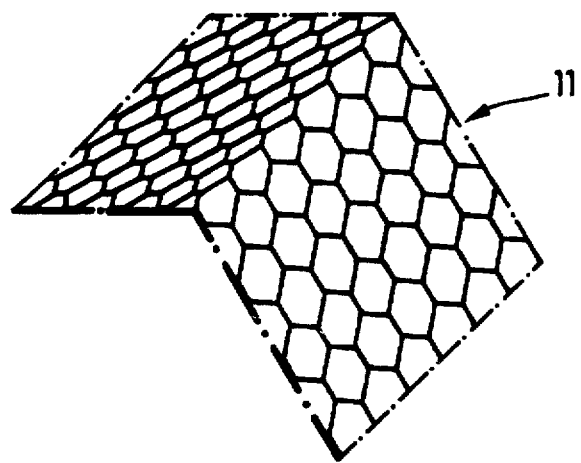

FIG. 6 is a plan view of a greatly magnified part of a wall of the honeycomb material according to the present invention, showing the filigree network (11) as obtained by the drawing process from a formable knitted textile sheet material containing the matrix material.

The present invention also concerns a process for manufacturing the honeycomb materials according to the present invention.

The manufacturing process according to the present invention comprises forming a formable textile sheet material produced from one of the above-described reinforcing yarns and containing the matrix material by drawing at a temperature at which any thermosetting matrix material present sets or any thermoplastic matrix material melts into a regular wavy sheet (1, 101, 201) which has on the textile base material (2, 102, 202) spaced-apart, straight-line, stripey elevations (3, 103, 203) with nettily porous walls, shape stabilizing the wavy sheet material, stacking a plurality of plies of this shaped material on top of one another with an offset in such a manner as to produce a honeycomb block (6, 106, 206), bonding the plies together in a tear-resistant manner at the stripey contact zones, and cutting the block perpendicularly to the bonding strips of the individual plies into slices of the desired thickness.

The shape of the wavy sheet material can of course also depart from the shape illustrated by way of example in FIG. 1. For instance, the wavy sheet materials produced may have peaked or curved wave crests, as illustrated in FIGS. 3a and 3b, so that the honeycomb packs produced on combination have hollow space shapes which differ from the conventional hexagonal shape and are illustrated in FIGS. 4a and 4b.

The drawing process to be carried out according to the present invention on the textile sheet material involves subjecting the textile material to a drawing tension which is sufficiently large for the surface area of the material to increase in the course of the shaping. The effect of the increase in surface area is to increase, at least in the region being deformed, the spaces between the adjacent threads of the textile material in such a way as to produce a porous network.

The drawing process on the textile sheet material advantageously comprises deep drawing.

The wavy sheet material is stabilized, if thermosetting resins are employed as matrix resin, in the course of the shaping being carried out at elevated temperature, which causes the resin to become crosslinked and hence cured. If thermoplastic matrix resins are used, stabilization of the wavy sheet material requires cooling down to below the melting point of the thermoplastic resin before the wave-forming tension is released from the shaped material.

The textile sheet material to be formed by drawing can be a woven fabric made of extensible, for example crimped or low draw ratio yarns.

Preferably, however, the textile sheet material is a knitted material, owing to its yarn arrangement, possesses particularly high extensibility. The textile sheet material subjected to shaping contains, as mentioned earlier, the matrix material in the similarly abovementioned amounts. Resins for the purposes of this invention are, as mentioned earlier, in principle all macromolecular crosslinked or uncrosslinked substances whose mechanical stability is sufficient to confer dimensional stability on them.

Crosslinked polymers which are suitable for use as matrix resin are two-component resins such as epoxy resins, mixtures of unsaturated polyesters (alkyds) with crosslinking agents, based for example on polymethylolmelamine, or thermosetting resins such as phenolic resins, melamine resins or urea resins.

Other, industrially less common resin systems can also be used.

Preferred matrix materials for some purposes are thermosetting resins, in particular phenolic, melamine or urea resins.

Particularly preferred matrix materials are thermoplastics, in particular polycondensates, especially partly or wholly aromatic polyesters, aliphatic or aromatic polyamides, polyether ketones, polyether ether ketones, polyether sulfones, polysulfones, polyphenylene sulfide or polyether imide.

The use of thermoplastic matrix resins is particularly preferred in particular when trouble-free recyclability of the honeycomb material is required.

The matrix material can for example be incorporated into the textile sheet material in the form of a powder or, in particular in the case of thermosetting matrix material, it can form an impregnation-applied coating on the filaments of the reinforcing yarn.

However, particular preference is given to shaping a textile sheet material which contains a thermoplastic matrix material in the form of filaments. In this case the textile sheet material can be produced from a commingled yarn composed of thermoplastic and reinforcing fibers, or yarns of thermoplastic fibers and yarns of non-melting or high-melting reinforcing fibers can be cowoven or coknitted in a conventional manner to produce the sheet material.

A further way of producing a textile sheet material which contains a thermoplastic matrix material in fiber form (herein the term "fibers" also encompasses continuous filament fibers as well as staple fibers) comprises using a yarn which consists as a whole or in part of bi-component fibers composed of a high-melting and a low-melting polymer material. In these bi-component fibers, the polymer components may be present in a side-by-side arrangement or in a concentric core-sheath arrangement.

An alternative process for manufacturing the honeycomb material according to the present invention comprises placing on top of one another a plurality of plies (7) of formable textile sheet material (8) produced from a reinforcing yarn and containing the matrix material, bonding together pairs of adjacent plies in a tear-resistant manner in spaced-apart straight, stripey zones, the stripey bonding zones (9) of successive layers being mutually offset, forming the resulting stack by pulling apart base and cover sheet into a honeycomb block, subjecting the block to a heat treatment to cure or melt the matrix resin, and, after stabilization, cutting it perpendicularly to the bonding strips of the individual plies into slices of the desired thickness.

In this case, the drawing of the honeycomb sheet materials takes place when the stack is pulled apart to form the honeycomb block.

The stabilization of the honeycomb block if thermosetting resins are used as matrix resins is effected in the course of the heat treatment, during which the resin crosslinks and hence hardens.

If thermoplastic matrix resins are used, stabilization of the honeycomb block requires cooling to below the melting point of the thermoplastic resin before the honeycomb-forming tension is released from the block.

The tear-resistant bond between the textile plies, necessary for forming the honeycomb block in both processes, is effected by sewing, adhering or welding.

The construction of the walls of the honeycomb material according to the present invention produces an extremely light, filigree structure which nonetheless possesses surprising mechanical stability. If subjected to an excess load, the structure does not suddenly collapse but deformation absorbs the forces. In addition, the open-pored network structure permits the flow of gases and other fluids through the honeycombs and if desired makes possible simple foaming out.

A further very significant advantage of the filigree structure is that it is surprisingly possible to produce a firmer bond between a sandwich core produced from the honeycomb material according to the present invention and the cover sheets.

The present invention further provides a sheetlike sandwich structure comprising two outer firm cover layers bonded together via a core comprising the above-described honeycomb material according to the present invention. The bonding between the cover layers and core can be effected by customary laminating processes using adhesives, in particular cold- or heat-curing adhesives, for example epoxy resins or thermosetting resins. Despite the open-pored network structure of the honeycomb material according to the present invention, the sandwich structures produced therewith combine a surprisingly high compressive strength with an extremely low weight. Especially where there is some flexibility in the choice of material, for example as with glass/polyether imide, they are highly suitable for use as construction material for fitting out the inside of motor vehicle, in particular aircraft, cells.

The following embodiment example illustrates the manufacture of a porous honeycomb material according to the present invention:

EXAMPLE

One thread each of a 340 dtex multifilament R glass yarn and of a 380 dtex 48 filament polyether imide yarn are air entangled to form a 720 dtex hybrid yarn. This hybrid yarn, which has a volume content of about 30% glass and about 70% polyether imide, is used to produce a piece of tight but extensible knitwear having a basis weight of 200 g/m$^2$.

This textile sheet material is introduced into a deep-drawing mold, heated to 320° C. and deep-drawn to form a wavy structure as per FIG. 1, in the course of which the textile sheet material opens to form a network. Thereafter the mold is cooled back down to room temperature.

The demolded material is stabilized in its shape by the polyether imide, which melts in the course of the deep-drawing, surrounds the glass fiber and then solidifies on cooling back down.

A plurality of plies of the wavy sheet material, which has parallel weblike elevations with flat wave crests, are stacked so as to produce a honeycomb block as per FIG. 2, and the individual plies are bonded together to form a firm honeycomb block by adhering at the contact surfaces with an epoxy resin adhesive.

The hexagonally structured honeycomb material thus produced has a density of only 30 kg/m$^3$ when the honeycomb side length is 5 mm. The compressive strength of a sandwich 10 mm in height made of this material and aluminum cover layers applied to both sides is 0.6 N/mm$^2$.

What is claimed is:

1. A honeycomb material comprising walls forming the honeycomb material, the walls consisting of a fiber composite of reinforcing yarn embedded in a resin matrix, wherein the yarn forms a network consisting of a multiplicity of crossingly interconnected elements within the composite with open voids in between, and wherein the weight ratio between the reinforcing yarn and the resin matrix is from 20:80 to 80:20.

2. The honeycomb material of claim 1, wherein the resin matrix is a thermoset resin.

3. The honeycomb material of claim 2, wherein the thermoset resin of the resin matrix is a phenolic resin, a melamine resin or a urea resin.

4. The honeycomb material of claim 1, wherein the reinforcing yarn of the fiber composite comprises filaments of inorganic material.

5. The honeycomb material of claim 4, wherein the inorganic material is selected from the group consisting of glass fibers, mineral fibers, ceramic fibers, and carbon fibers.

6. The honeycomb material of claim 1, wherein the resin matrix is a thermoplastic material, and wherein the reinforcing yarn comprises filaments with a higher melting point than the thermoplastic material.

7. The honeycomb material of claim 6, wherein the thermoplastic material comprises an organic polymer.

8. The honeycomb material of claim 7, wherein the organic polymer has a melting point of 100°–350° C.

9. The honeycomb material of claim 7, wherein the organic polymer is a substituted or unsubstituted polyalkylene.

10. The honeycomb material of claim 7, wherein the organic polymer comprises at least one polymer selected from the group consisting of a partly or wholly aromatic polyester, an aliphatic or aromatic polyamide, a polyether ketone, a polyether ether ketone, a polyether sulfone, a polysulfone, a polyphenylene sulfide and a polyether imide.

11. The honeycomb material of claim 7, wherein the organic polymer is selected from the group consisting of a substituted or unsubstituted polyethylene, a substituted or unsubstituted polypropylene, and a substituted or unsubstituted polyvinyl chloride.

12. The honeycomb material of claim 6, wherein the filaments of the reinforcing yarn of the fiber composite comprise an inorganic material whose melting point is higher than the melting point of the thermoplastic material.

13. The honeycomb material of claim 12, wherein the material is selected from the group consisting of glass fibers, mineral fibers, ceramic fibers, and carbon fibers.

14. The honeycomb material of claim 6, wherein the melting point of the filaments of the reinforcing yarn of the fiber composite is at least 10° C. above the melting point of the thermoplastic material.

15. The honeycomb material of claim 6, wherein the filaments of the reinforcing yarn of the fiber composite comprise an organic, spinnable material whose melting point is higher than the melting point of the thermoplastic material.

16. The honeycomb material of claim 6, wherein the melting point of the filaments of the reinforcing yarn of the fiber composite is at least 30° C. above the melting point of the thermoplastic material.

17. A sheetlike sandwich structure comprising two outer firm cover layers bonded together via a core of lightweight material, wherein the core comprises the honeycomb material of claim 1.

* * * * *